(12) United States Patent
Tada

(10) Patent No.: US 10,295,374 B1
(45) Date of Patent: May 21, 2019

(54) ROTATION ANGLE DETECTING DEVICE AND AN ELECTRIC MOTOR PROVIDED WITH THE ROTATION ANGLE DETECTING DEVICE

(71) Applicant: IGARASHI ELECTRIC WORKS LTD., Kawasaki-shi, Kanagawa (JP)

(72) Inventor: Junichi Tada, Kawasaki (JP)

(73) Assignee: IGARASHI ELECTRIC WORKS LTD., Kawasaki-shi, Kanagawa (JP)

( * ) Notice: Subject to any disclaimer, the term of this patent is extended or adjusted under 35 U.S.C. 154(b) by 39 days.

(21) Appl. No.: 15/577,372

(22) PCT Filed: Jul. 13, 2016

(86) PCT No.: PCT/JP2016/070703
§ 371 (c)(1),
(2) Date: Nov. 28, 2017

(87) PCT Pub. No.: WO2018/011915
PCT Pub. Date: Jan. 18, 2018

(51) Int. Cl.
*G01D 5/20* (2006.01)
*H02K 11/225* (2016.01)
*H02K 24/00* (2006.01)

(52) U.S. Cl.
CPC .......... *G01D 5/2073* (2013.01); *H02K 11/225* (2016.01); *H02K 24/00* (2013.01)

(58) Field of Classification Search
CPC ..... G01D 5/2073; H02K 11/225; H02K 24/00
(Continued)

(56) References Cited

U.S. PATENT DOCUMENTS 6,239,571 B1    5/2001  Shimahara
2008/0120850 A1*  5/2008  Brandl ................. G01D 5/2053
                                                  33/1 PT
(Continued)

FOREIGN PATENT DOCUMENTS

JP    3047231 B1    5/2000
JP    4397788 B2    1/2010
(Continued)

OTHER PUBLICATIONS

International Search Report Corresponding to PCT/JP2016/070703 dated Aug. 16, 2016.
(Continued)

*Primary Examiner* — Alex W Mok
(74) *Attorney, Agent, or Firm* — Davis & Bujold PLLC; Michael J. Bujold

(57) ABSTRACT

A rotation angle detecting device and an electric motor provided with the rotation angle detecting device. The rotation angle detecting device has both a reduced thickness and outer diameter and is easily fixed to a small-sized electric motor. The rotation angle detecting device has a first sheet coil, provided with an excitation coil, mounted on a base fixed to a fixed body, a second sheet coil, provided with a detecting coil, mounted on a surface of a rotating plate opposite the base, the rotating plate is fixed to a rotating shaft, a third sheet coil, provided with a primary coil of an output transformer, mounted on another surface of the rotating plate opposing to a cover, and a fourth sheet coil, provided with a secondary coil of the output transformer, mounted on a facing surface of the cover opposite the rotating plate.

11 Claims, 6 Drawing Sheets

(58) Field of Classification Search
USPC .......................................................... 310/68 B
See application file for complete search history.

(56) References Cited

U.S. PATENT DOCUMENTS

| | | | | |
|---|---|---|---|---|
| 2011/0031850 A1* | 2/2011 | Nakamura | ............. | H02K 5/225 310/68 B |
| 2011/0043196 A1* | 2/2011 | Fujita | .................. | G01D 5/2046 324/207.16 |
| 2011/0109304 A1* | 5/2011 | Suzuki | .................. | H02K 24/00 324/207.25 |
| 2012/0200202 A1* | 8/2012 | Asai | ..................... | H02K 11/225 310/68 B |
| 2012/0274185 A1* | 11/2012 | Kanemitsu | ............. | H02K 24/00 310/68 B |
| 2015/0309069 A1 | 10/2015 | Boillot et al. | | |

FOREIGN PATENT DOCUMENTS

| | | |
|---|---|---|
| JP | 2013-051825 A | 3/2013 |
| JP | 2016-509209 A | 3/2016 |
| JP | 6945090 B1 | 7/2016 |

OTHER PUBLICATIONS

Written Opinion Corresponding to PCT/JP2016/070703 dated Aug. 16, 2016.

* cited by examiner

ROTATION ANGLE DETECTING DEVICE AND AN ELECTRIC MOTOR PROVIDED WITH THE ROTATION ANGLE DETECTING DEVICE

TECHNICAL FIELD

The present invention relates to a rotation angle detecting device and an electric motor provided with the rotation angle detecting device.

BACKGROUND OF THE INVENTION

A conventional rotation angle detecting device comprises a stator having a ring-shaped stator core and a rotor which is made of a magnetic material and is disposed in the stator, wherein the stator is provided with pluralities of salient poles directed in a centripetal direction from the ring-shaped stator core, and wherein a coil is wound around each of the salient poles (please see Patent Literature 1 or 2).

However, such a conventional rotation angle detecting device has a large device thickness in an axial direction of the rotor because the coil is wound around each of the salient poles directed perpendicularly to the axial direction of the rotor.

For the purpose of reducing thickness of a whole rotation angle detecting device, another conventional rotation angle detecting device has a constitution that a sheet coil is applied as each of an excitation coil disposed on a base portion of a stator and a detecting coil disposed on a rotating plate fixed to a rotating shaft of a rotor so as to face the excitation coil, and that an output transformer is constructed from a primary coil disposed on an outer peripheral surface of the rotor and a secondary coil disposed on an inner peripheral surface of the base portion of the stator so as to face the primary coil (please see Patent Literature 3).

However, there is a problem with the device with which such a sheet coil is used that an outer diameter of the whole rotation angle detecting device centered on the rotating shaft is large because the primary and secondary coils constructing the output transformer are respectively disposed on the outer peripheral surface of the rotor and the inner peripheral surface of the base portion of the stator, and the excitation coil and the detecting coil are further arranged at an outside of the output transformer so as to face each other.

The present inventor provided a device for the purpose of reducing thickness of a whole rotation angle detecting device, wherein the device has a constitution that a sheet coil is applied as each of the primary and secondary coils constructing the output transformer in the Patent Literature 3, and that each of these sheet coils are disposed on each of a base portion of a stator and a facing surface of a rotating plate opposing to the base portion at an inside of an excitation coil and a detecting coil each of which consists of respective other sheet coils (please see PCT/JP2015/82047 and the application entered into the national phase in Japan: Patent Application No. 2016-509209).

PRIOR ART

Patent Literatures

Patent Literature 1: JP 4,397,788 B
Patent Literature 2: JP 2013-51825 A
Patent Literature 3: JP 3,047,231 B

SUMMARY OF THE INVENTION

Problems to be Solved by the Invention

The rotation angle detecting devices described in each specification and drawings of the Patent Literature 3 and the above PCT application are capable of reducing thickness of a whole device. On the other hand, there is a problem that an outer diameter of a whole device centered on a rotating shaft is large because a pair of the primary and secondary coils constructing the output transformer and another pair of the excitation coil and the detecting coil are arranged in a shape of an inner and outer double ring centered on the rotating shaft.

In view of the above disadvantages of the conventional technique, an object of the present invention is to provide a rotation angle detecting device and an electric motor provided with the rotation angle detecting device, wherein the rotation angle detecting device is capable of not only reducing thickness of a whole device, but also reducing an outer diameter of the whole device centered on a rotating shaft, and thereby easily fixing to a small-sized electric motor and so on.

Moreover, another object of the present invention is to easily and securely connect sheet coils disposed on each side of a rotating plate through which the rotating shaft passes, and to increase detection accuracy by canceling a noise generated in an excitation coil.

Means for Solving the Problems

The above problems are solved by the present invention as follows.

(1) A rotation angle detecting device for detecting a rotation angle of a rotating shaft rotatably installed in a fixed body, wherein the device comprises;
  a rotating plate fixed to the rotating shaft;
  a base mounted on the fixed body so as to face the rotating plate;
  a cover fixed to the fixed body so as to spread over the rotating plate;
  a first sheet coil which is mounted on a facing surface of the base opposing to the rotating plate and is provided with an excitation coil;
  a second sheet coil which is mounted on a facing surface of the rotating plate opposing to the base and is provided with a detecting coil opposing to the excitation coil;
  a third sheet coil which is mounted on another facing surface of the rotating plate opposing to the cover and is provided with a primary coil of an output transformer connected to the detecting coil by a connection assembly passing through the rotating plate; and
  a fourth sheet coil which is mounted on a facing surface of the cover opposing to the rotating plate and is provided with a secondary coil opposing to the primary coil of the output transformer.

According to such a configuration: since a pair of the primary and secondary coils which constitute the output transformer, and another pair of the excitation coil and the detecting coil are aligned in the axial direction of the rotating shaft, an outer diameter of a whole device centered on the rotating shaft is reduced; and since the all coils are sheet coils, the whole device can be made thin.

Therefore, the rotation angle detecting device of the present invention can be easily fixed 4 member which rotates or turns supported by a shaft such as not only an electric motor, but also a part between a rotating shaft and a bearing, an articulated arm part of a robot, etc., and the device can precisely detect the rotation angle or the turning angle of such a member which rotates or turns supported by a shaft.

(2) Regarding the above item (1), the connection assembly comprises one or more conducting strips which are disposed on an outer peripheral surface of the rotating shaft passing through the rotating plate and are oriented in an axial direction of the rotating shaft so as to extend over both lateral sides of the rotating plate, a contactor connected to a terminal of the detecting coil of the second sheet coil so as to contact with the conducting strip, and another contactor connected to a terminal of the primary coil of the third sheet coil so as to contact with the conducting strip.

According to such a configuration, by fixing the second and third sheet coils to the rotation plate from its both sides such that their contactors are respectively coordinated to the positions of the conducting strips disposed on the outer peripheral surface of the rotating shaft, the contactors are respectively contacted with the conducting strips, and thereby electrically connecting the detecting coil with the primary coil via the conducting strips easily and securely.

Moreover, since the second and third sheet coils can be electrically connected at a part near to the rotating shaft, a dynamic unbalance is hard to occur compared to a case that they are connected to the outer peripheral part of the rotating plate.

(3) Regarding the above item (1), the rotating plate comprises a disk part with a central hole and a cylindrical shaft fitted to the central hole, and wherein the connection assembly comprises one or more conducting strips which are disposed on an outer peripheral surface of the rotating shaft passing through the rotating plate and are oriented in an axial direction of the rotating shaft so as to extend over both lateral sides of the rotating plate, a contactor connected to a terminal of the detecting coil of the second sheet coil so as to contact with the conducting strip, and another contactor connected to a terminal of the primary coil of the third sheet coil so as to contact with the conducting strip.

According to such a configuration, not only the same effects as the above item (2), but also without directly treating the rotating shaft in order to fix the conducting strips, the second and third sheet coils can be connected in the rotating plate.

(4) Regarding the above item (2) or (3), each of the contactors is made of an elastic tongue piece deformable in an axial direction of the rotating plate.

According to such a configuration, since each of the contactors is an elastic tongue piece deformable in the axial direction of the rotating plate, each of the contactors is elastically deformed in the axial direction of the rotating plate so as to be pressure welded to each of the conducting strips naturally when the second and third sheet coils are respectively positioned to be fixed to each side of the rotating plate. Therefore, it is easy to fix the second and third sheet coils to the rotating plate, and the electrical connections of the contactors to each of the conducting strips are not disconnected because the contactors are pressure welded to the corresponding conducting strips by their elastic restoring force.

(5) Regarding any one of the above items (2) to (4), each of the contactors is fixed to the conducting strip.

According to such a configuration, not only the electrical connections between the contactors and the corresponding conducting strips are made strong, but also a position aberration in the axial direction of the rotating plate to the rotating shaft or a position aberration of the disk part to the cylindrical shaft of the rotating plate can be prevented. Therefore, a fixing means of the rotating plate to the rotating shaft or a fixing means of the disk part to the cylindrical shaft of the rotating plate can be omitted.

(6) Regarding the above item (1), the connection assembly is a conducting wire connecting the terminal of the detecting coil of the second sheet coil and the terminal of the primary coil of the third sheet coil by passing through the rotating plate.

According to such a configuration, the connection assembly can be considerably simplified.

(7) Regarding any one of the above items (1) to (6), a ring-shaped core is respectively interposed between the base and the first sheet coil, between the facing surface of the rotating plate opposing to the base and the second sheet coil, between the facing surface of the rotating plate opposing to the cover and the third sheet coil, and between the cover and the fourth sheet coil.

According to such a configuration, each magnetic flux density generated by the currents passing through each of the coils is increased to intensify a detection output.

(8) Regarding the above item (7), the excitation coil and the detecting coil are configured such that inner diameter parts of each of the coils are formed by coupling each corresponding gap between inner ends of pluralities of radially directed parts via each inner arcuate part, and outer diameter parts of each of the coils are formed by coupling each corresponding gap between outer ends of the radially directed parts via each outer arcuate part;

that an inner diameter of the core mounted on the base is larger than an inner diameter configured by the inner arcuate parts of the excitation coil;

that an outer diameter of the core mounted on the base is smaller than an outer diameter configured by the outer arcuate parts of the excitation coil;

that an inner diameter of the core mounted on the facing surface of the rotating plate opposing to the base is larger than an inner diameter configured by the inner arcuate parts of the detecting coil; and that an outer diameter of the core mounted on the facing surface of the rotating plate opposing to the base is smaller than an outer diameter configured by the outer arcuate parts of the detecting coil.

According to such a configuration, each of the cores forming a magnetic field faces to only the corresponding radially directed parts of the excitation coil and the detecting coil, and therefore it is possible to eliminate a magnetic influence by the arcuate parts of each of the coils, and to improve an S/N ratio, that is a signal-to-noise ratio.

Accordingly, it is possible to reduce exciting currents and to make each of the coils smaller such that the whole device is made smaller.

(9) Regarding any one of the above items (1) to (8), the excitation coil comprises a first and a second excitation coils which are respectively disposed on a front and rear surfaces of an insulation sheet such that phases of each electrical angle of them are different from each other.

According to such a configuration, detection accuracy is increased while keeping the downsizing and the thinning of the whole device.

(10) Regarding the above item (9), the first and second excitation coils are polarity inversion excitation coils each of which the phase is inverted at an angular position of 180°.

According to such a configuration, a noise on the side of excitation can be canceled to increase the detection accuracy.

(11) An electric motor with a rotation angle detecting device comprising an electric motor of which one end portion of a rotating shaft protrudes from one end of a motor housing, and the rotation angle detecting device according to any one of the above items (1) to (10), wherein the base is fixed to the motor housing, and the rotating plate is fixed to the rotating shaft of the electric motor.

According to such a configuration, it is possible to provide a small-sized electric motor with a rotation angle detecting device of which the whole rotation angle detecting device is made downsized and thin.

Advantages of the Invention

According to the present invention, it is able to provide a rotation angle detecting device and an electric motor provided with the rotation angle detecting device, wherein the rotation angle detecting device is capable of not only reducing thickness of a whole device, but also reducing an outer diameter of the whole device centered on a rotating shaft, and thereby easily fixing to a small-sized electric motor and so on.

Moreover, it is able to easily and securely connect sheet coils disposed on each side of a rotating plate through which the rotating shaft passes, Furthermore, it is able to increase the detection accuracy by canceling a noise generated in an excitation coil.

EMBODIMENTS OF THE INVENTION

A first embodiment of a rotation angle detecting device of the present invention and an electric motor with the rotation angle detecting device is described with FIGS. 1 to 5.

Figure 1:
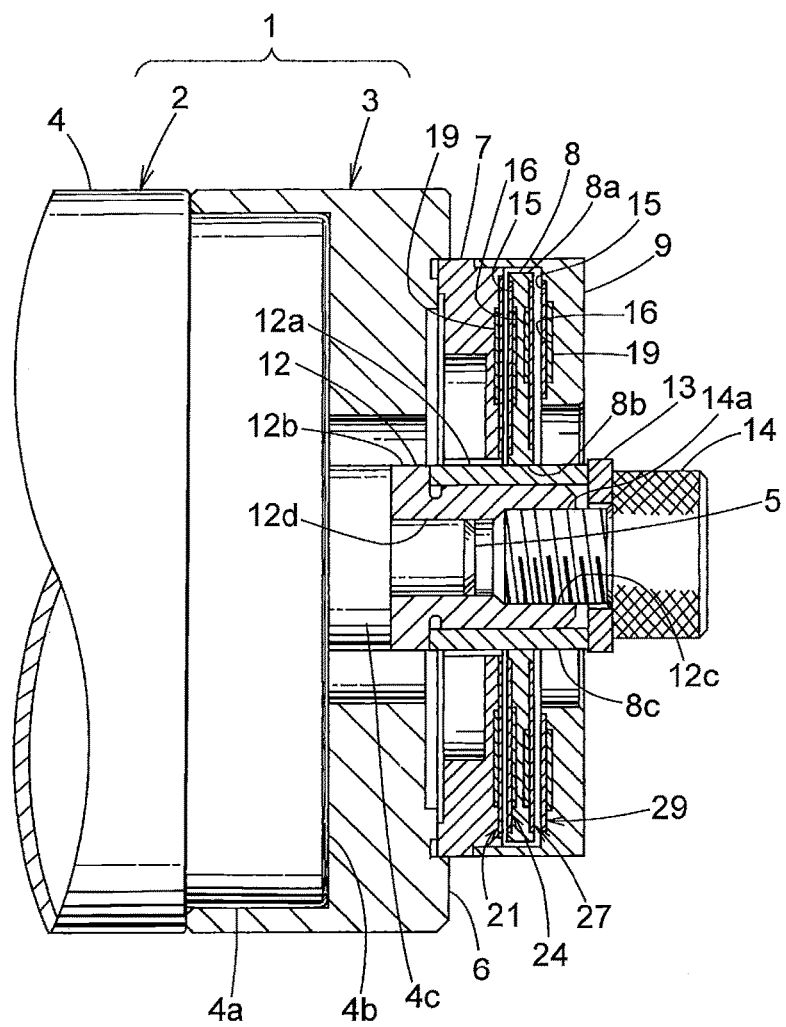
FIG. 1 is a vertical sectional front view showing a first embodiment of a rotation angle detecting device of the present invention in a state that the device is fixed to an end part of an electric motor so as to form an electric motor with the rotation angle detecting device of the present invention.
Figure 2:
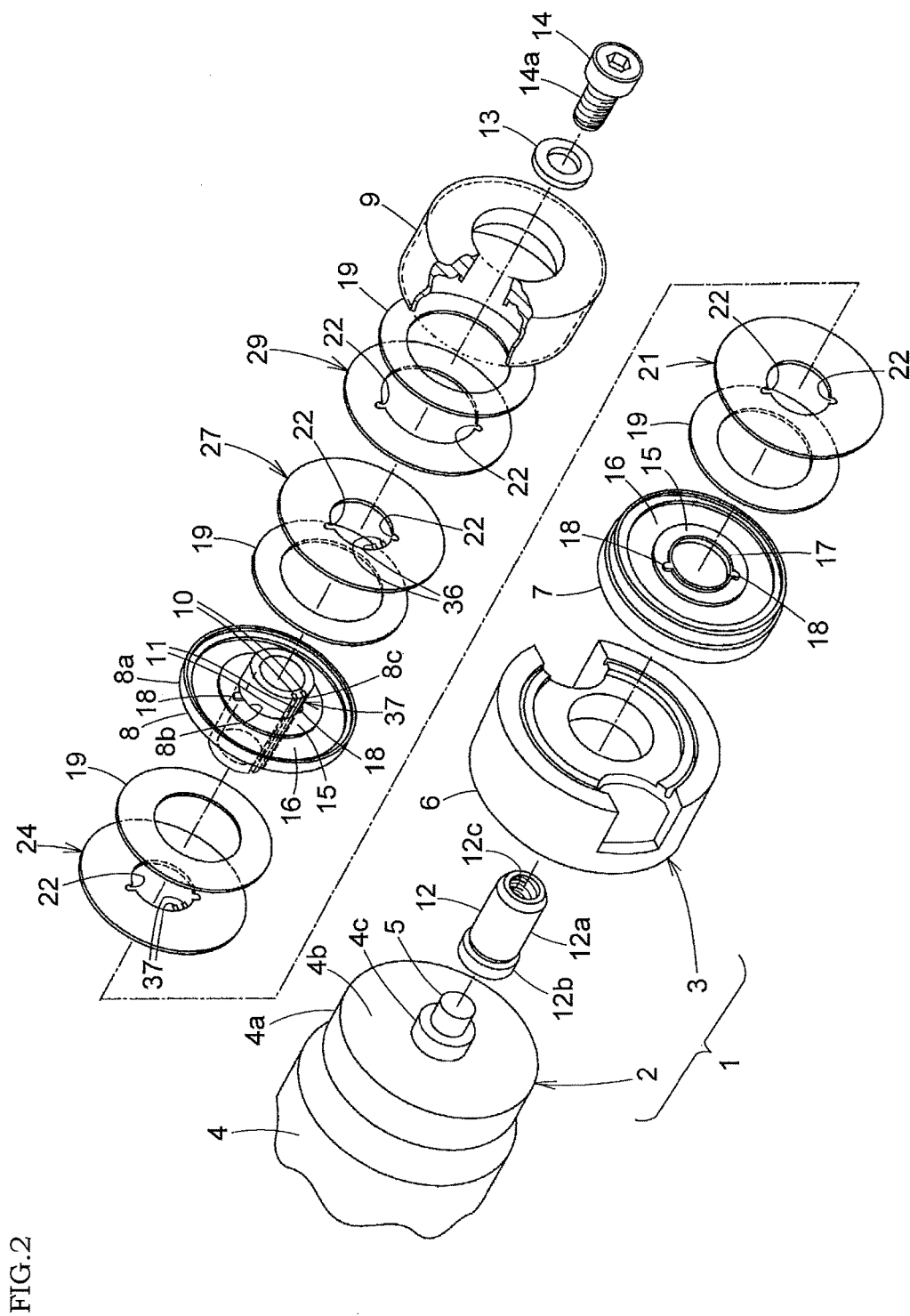
FIG. 2 is an exploded perspective view showing the rotation angle detecting device in the first embodiment.

As shown in FIGS. 1 and 2, an electric motor with a rotation angle detecting device 1 comprises an electric motor 2 shown as a small DC motor and a rotation angle detecting device 3 installed on an end part of the electric motor 2.

The electric motor 2 has a horizontal-cylindrical motor housing 4. This housing 4 comprises a reduced diameter part 4a formed on its end portion, an end plate 4b closing an end opening of the reduced diameter part 4a, and a boss part 4c formed at a center of the end plate 4b. A rotating shaft 5 is rotatably supported by the boss part 4c such that an end portion of the rotating shaft 5 protrudes outward from the motor housing 4.

Since other components of the electric motor 2 are the same as those of a publicly-known small DC motor and are not directly related to the present invention, the drawings and the detailed explanation of them are omitted.

A rotation angle detecting device 3 detects a rotation angle of the rotating shaft 5 to the motor housing 4 which is a fixed body of the electric motor 2. This device 3 comprises a cylindrical fixing pedestal 6 fitted onto a reduced diameter part 4a of the motor housing 4, a ring-shaped base 7 fixed on an outer end face of this fixing pedestal 6, a rotating plate 8 fixed to the rotating shaft 5 so as to face the base 7, and a horizontal-bottomed-cylindrical cover 9 fixed to the base 7 so as to spread over the rotating plate 8.

Figure 4:
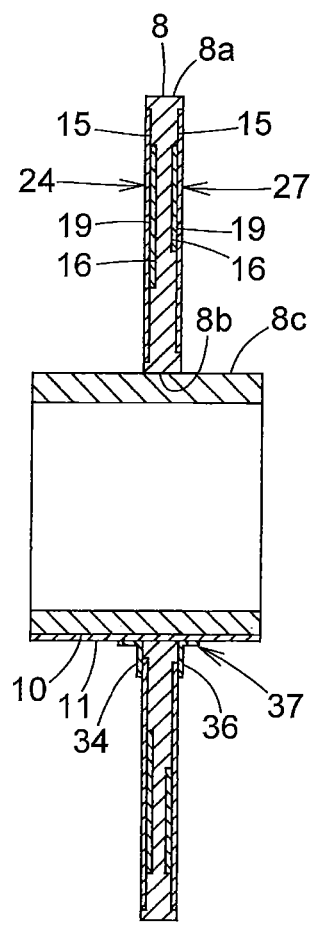
FIG. 4 is an enlarged cross-sectional plan view showing a connecting part between the coils of the second and third sheet coils of the rotation angle detecting device in the first embodiment.

The rotating plate 8 comprises a disk part 8a with a central hole 8b and a cylindrical shaft 8c passing through the central hole 8b. As shown in FIGS. 2 and 4, two recessed grooves 10, 10 oriented in an axial direction so as to extend over both lateral sides of the disk part 8a are formed on an outer peripheral surface of the cylindrical shaft 8c, and a conducting strip 11 is fitted to each of the recessed grooves 10, 10. This conducting strip 11 may be a conducting wire or a conductive metal piece.

The rotating plate 8 is formed by fitting a conducting strip 11 to each of the recessed grooves 10, 10 on the outer peripheral surface of the cylindrical shaft 8c and then fitting the central hole 8b of the disk part 8a onto the cylindrical shaft 8c. It is preferable that the rotating plate 8 is fixed at an intermediate position of the cylindrical shaft 8c by a glue or the like as necessary.

As shown in FIG. 2, a cap 12 with screw hole is fixed onto a tip portion of the rotating shaft 5 protruding from the boss part 4c of the motor housing 4, wherein the cap 12 comprises a shaft 12a of which base end portion is formed in an increased diameter flange 12b, wherein a screw hole 12c is formed in a tip portion of the shaft 12a, and wherein a shaft hole 12d (see FIG. 1) is formed in a base end portion of the cap 12 so as to be press-fitted onto the tip portion of the rotating shaft 5.

The cylindrical shaft 8c of the rotating plate 8 is fitted onto the shaft 12a of the cap 12 with screw hole, and a male screw 14a of a bolt 14 is screwed into the screw hole 12c of the cap 12 with screw hole by interposing a washer 13 from outside and is fastened. Thus, the rotating plate 8 is pressure held between the increased diameter flange 12b of the cap 12 with screw hole and the washer 13 so as to be strongly fixed to the rotating shaft 5.

As shown in FIGS. 1 and 2, a shallow and circular sheet-coil-holding cavity 15 and a circular core-holding cavity 16 which is larger in diameter and is deeper than the cavity 15 are concentrically formed on a facing surface of the base 7 opposing to the rotating plate 8.

Pluralities of positioning protrusions 18, 18 are provided on an outer peripheral surface of a short boss part 17 formed at a center of the base 7 accompanied with a formation of the sheet-coil-holding cavity 15 on the surface of the base 7 facing to the rotating plate 8.

It is preferable that an interval angle between the both positioning protrusions 18, 18 on the outer peripheral surface of the bass part 17 is set at other than 180°, such as 170° on one side and 190° on the other side. The reason is to prevent a sheet coil described later from being mistaken about the front and back sides of it when it is taken in the sheet-coil-holding cavity 15.

A ring-shaped core 19 made of a high magnetic permeability material such as a silicon steel sheet and a first sheet coil 21 with an excitation coil 20 (see FIG. 3) are respectively mounted in the core holding cavity 16 and the sheet-coil-holding cavity 15 of the base 7 such that the ring-shaped core 19 and the first sheet coil 21 face to the rotating plate 8.

Positioning hollows 22, 22 are formed on an inner circumferential end portion of the first sheet coil 21 at positions corresponding to the positions of the positioning protrusions 18, 18 of the base 7. By engaging these positioning hollows 22, 22 with the positioning protrusions 18, 18, the first sheet coil 21 can be precisely taken in the sheet-coil-holding cavity 15 of the base 7 without being mistaken about the front and back sides of it.

A shallow and circular sheet-coil-holding cavity 15 and a circular core-holding cavity 16 which is larger in diameter and is deeper than the cavity 15 are concentrically formed on respective facing surfaces of the disk part 8a of the rotating plate 8 so as to face the base and the cover respectively, and are concentrically formed on a facing surface of the cover 9 opposing to the rotating plate 8, wherein these cavities 15, 16 are respectively the same as the sheet-coil-holding cavity 15 and the core holding cavity 16 of the base 7.

Although there are some differences in shapes among the sheet-coil-holding cavities 15 and among the core holding cavities 16 respectively, the sheet-coil-holding cavities 15 and the core holding cavities 16 are respectively shown by each common reference sign to simplify the description. Positioning protrusions 18, 18, not all of them are shown, are provided on an inner circumferential end portion of each of the sheet-coil-holding cavities 15, wherein they are the same as the positioning protrusions 18, 18 provided on the inner circumferential end portion of the sheet-coil-holding cavity 15 of the base 7, and wherein they are also shown by the common reference sign.

A ring-shaped core 19 made of a silicon steel sheet or the like is mounted in each of the core holding cavities 16, wherein the cavity 16 is formed on each of the facing surfaces of the disk part 8a of the rotating plate 8 so as to face the base and the cover respectively, and is also formed on the facing surface of the cover 9 opposing to the rotating plate 8, and wherein these ring-shaped cores 19 are the same as those mounted in the core holding cavity 16 of the base 7. Since the core 19 having a high magnetic permeability is disposed on each of the faces of the disk part 8a of the rotating plate 8, the disk part 8a can be made of a material having a low magnetic permeability, such as a synthetic resin material, an aluminum light alloy, a stainless steel, etc.

A second sheet coil 24 provided with a detecting coil 23 (see FIG. 3) facing the excitation coil 20 is mounted in the sheet-coil-holding cavity 15 formed on the facing surface of the disk part 8a of the rotating plate 8 opposing to the base. A third sheet coil 27 provided with a primary coil 26 (see FIG. 3) of an output transformer 25 is mounted in the sheet-coil-holding cavity 15 formed on the facing surface of the disk part 8a of the rotating plate 8 opposing to the cover. A fourth sheet coil 29 provided with a secondary coil 28 facing the primary coil 26 of the output transformer 25 is mounted in the sheet-coil-holding cavity 15 formed on the facing surface of the cover 9 opposing to the rotating plate 8.

Positioning hollows 22, 22 are formed on each inner circumferential end portion of the second sheet coil 24, the third sheet coil 27 and the fourth sheet coil 29, wherein these hollows are the same as the positioning hollows 22, 22 formed on the inner circumferential end portion of the first sheet coil 21. By engaging these hollows 22, 22 with the corresponding positioning protrusions 18, 18, the second sheet coil 24, the third sheet coil 27 and the fourth sheet coil 29 can be precisely taken in each of the corresponding sheet-coil-holding cavities 15 without being mistaken about the front and back sides of them.

Figure 3:
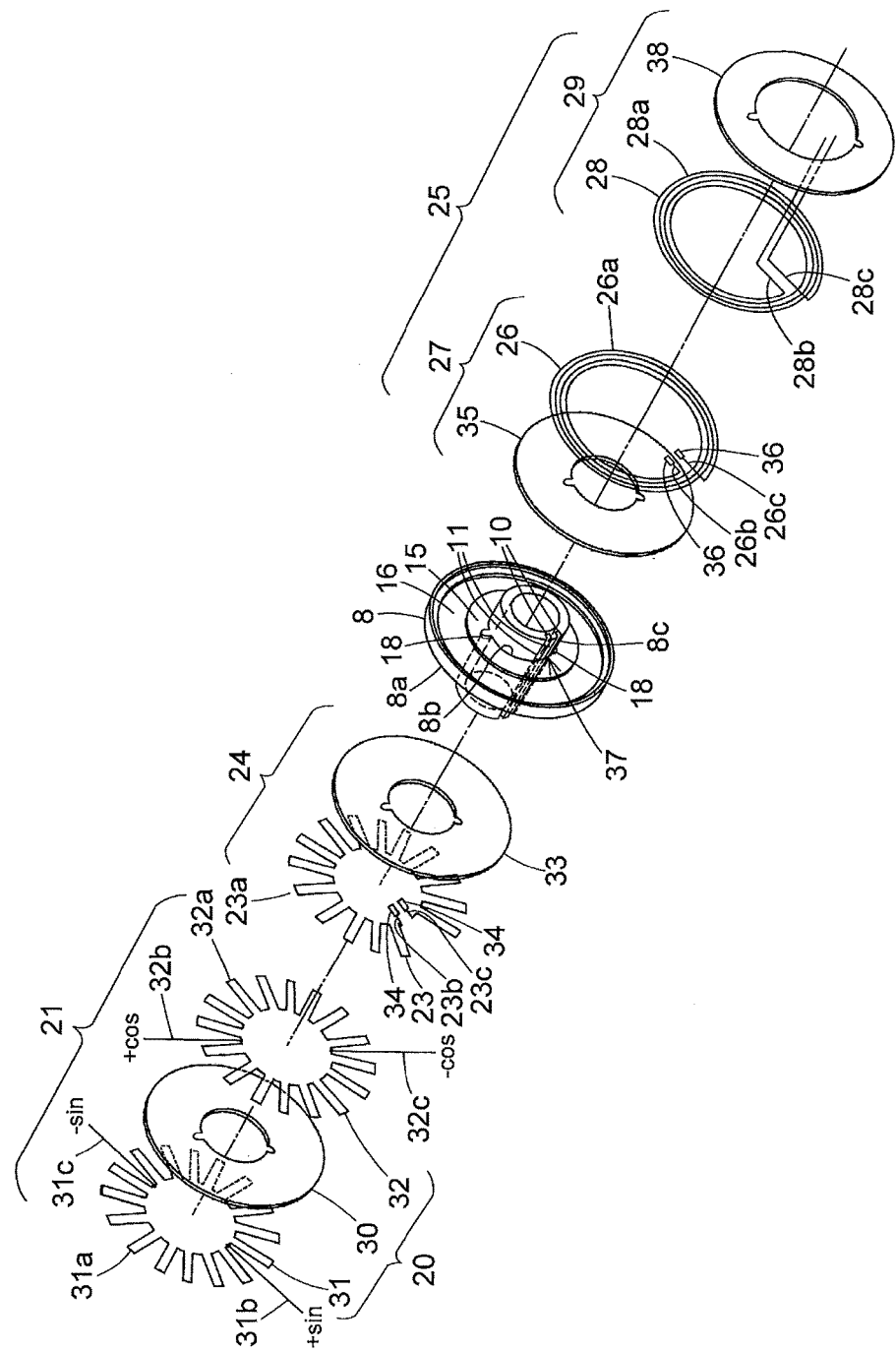
FIG. 3 is an exploded perspective view schematically showing coils in a first to a fourth sheet coils of the rotation angle detecting device in the first embodiment.

Next, with referring to FIG. 3, the respective coils in the first to fourth sheet coils 21, 24, 27, 29 are explained.

The excitation coil 20 of the first sheet coil 21 comprises the first and second excitation coils 31, 32 which are respectively disposed on the front and back surfaces of an insulation sheet 30 made of a prepreg or the like such that the electrical angle phases of them are different from each other, such as 90°. The first and second excitation coils 31, 32 are polarity inversion excitation coils each of which the phase is inverted at an angular position of 180°.

As schematically shown in FIG. 3 for easily understanding: the first excitation coil 31 comprises an annular coil 31a which is formed in an irregular pattern meandering in the inside-outside direction such that a profile of a spur gear is traced, and lead wires 31b, 31c which are respectively connected to front and rear sides of the annular coil 31a so as to be offset at an angle of 180°; and the second excitation coil 32 comprises an annular coil 32a having the same shape as the annular coil 31a, and lead wires 32b, 32c which are respectively connected to upper and lower sides of the annular coil 32a so as to be offset at an angle of 180°. However, the formation of the first and second excitation coils is not limited in such a pattern. Actually, many patterns can be conceived for the formation.

Figure 5:
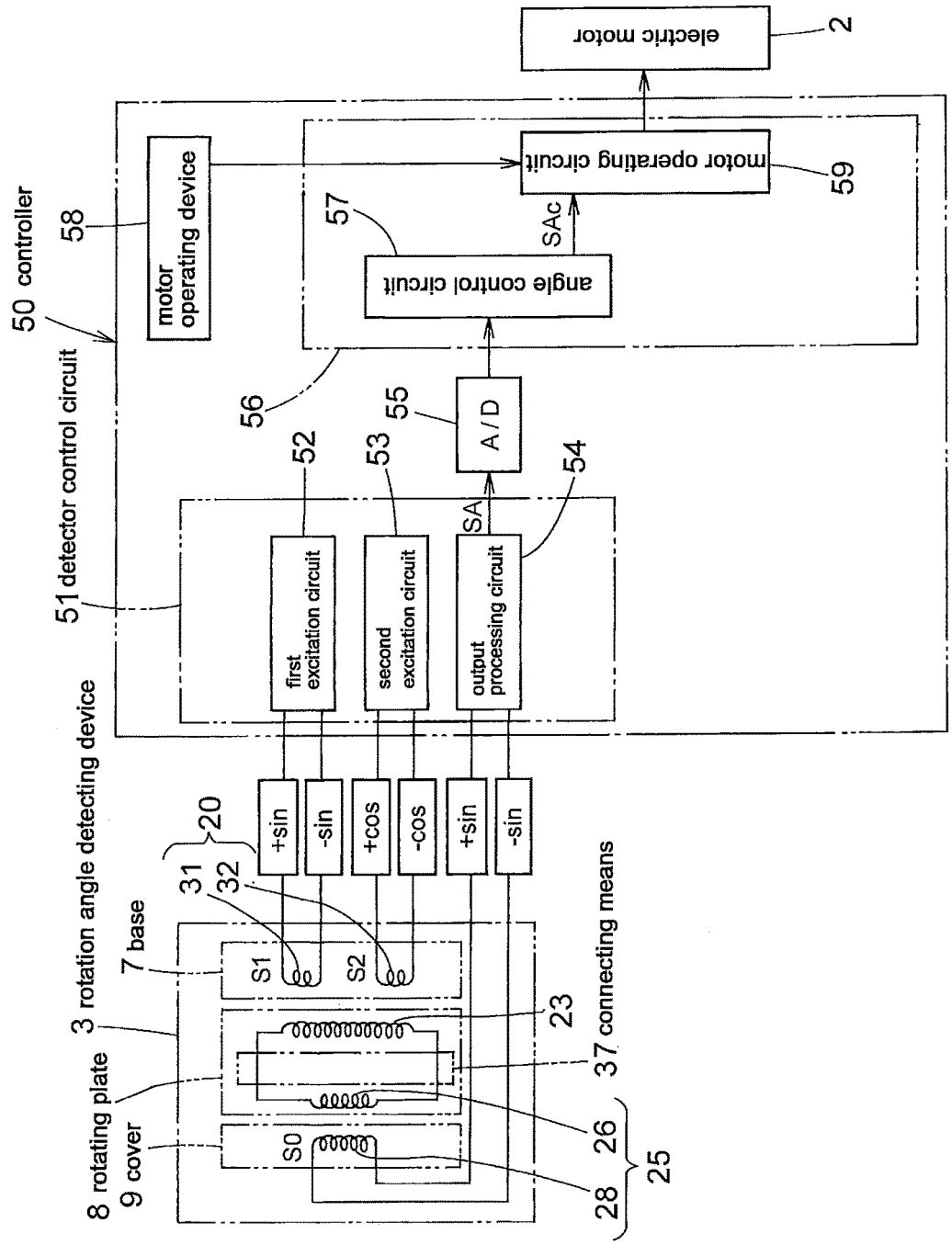
FIG. 5 is a block diagram of a controller in the first embodiment.

A high frequency voltage is applied to the lead wires 31b, 31c of the first excitation coil 31 by a first excitation circuit 52 of a detector control circuit 51 of a controller 50 shown in FIG. 5. A high frequency voltage is also applied to the lead wires 32b, 32c of the second excitation coil 32 by a second excitation circuit 53 of the detector control circuit 51.

The detecting coil 23 of the second sheet coil 24 is disposed on one side of an insulation sheet 33 which is the same as the insulation sheet 30, wherein the detecting coil 23 is formed by cutting a front part of an annular coil 23a which is formed in an irregular pattern meandering in the inside-outside direction such that a profile of a spur gear is traced in the same way as the annular coil 31a of the above the first excitation coil 31, and by separating the obtained terminals 23b, 23c vertically. There is a case that the detecting coil 23 is disposed on each side of the insulation sheet 33.

A contactor 34 shaped in an elastic tongue piece made of a conductive metal piece is connected to each of the terminals 23b, 23c of the annular coil 23a so as to be directed in a centripetal direction.

As shown in FIG. 4, each of the contactors 34 is elastically deformed in an axial direction of the cylindrical shaft 8c of the rotating plate 8 so as to be pressure welded to each of the conducting strips 11.

The primary coil 26 of the third sheet coil 27 has a spiral coil part 26a disposed on one side of an insulation sheet 35 which is the same as the insulation sheet 33. There is a case that the spiral coil part 26a is disposed on each side of the insulation sheet 35.

A contactor 36 shaped in an elastic tongue piece made of a conductive metal piece which is the same as the contactor 34 is connected to each terminal 26b, 26c of the spiral coil part 26a so as to be directed in a centripetal direction.

As shown in FIG. 4, each of the contactors 36 is elastically deformed in the axial direction of the cylindrical shaft 8c of the rotating plate 8 so as to be pressure welded to each of the conducting strips 11, too.

A connection assembly 37 is formed with the conducting strips 11 each of which is fitted to each of the recessed grooves 10 provided on the outer peripheral surface of the cylindrical shaft 8c of the rotating plate 8, the contactors 34 of the second sheet coil 24, and the contactors 36 of the third sheet coil 27. The connection assembly 37 electrically connects the detecting coil 23 of the second sheet coil 24 and the primary coil 26 of the third sheet coil 27 by passing through the disk part 8a of the rotating plate 8.

The contactors 34 of the second sheet coil 24 and the contactors 36 of the third sheet coil 27 are preferably fixed to each of the conducting strips 11 disposed on the outer peripheral surface of the cylindrical shaft 8c by soldering or the like.

Thus, not only the electrical connections between the contactors 34, 36 and the corresponding conducting strips 11 are made strong, but also a position aberration of the disk part 8a to the cylindrical shaft 8c in the rotating plate 8 can be prevented. Therefore, a fixing means of the disk part 8a to the cylindrical shaft 8c in the rotating plate 8 can be omitted.

Moreover, soldering parts for the contactors 34, 36 are exposed outward from the disk part 8a of the rotating plate 8, and therefore the soldering parts can be visually recognized from the outside and a risk of negligence of soldering can be prevented.

The secondary coil 28 of the fourth sheet coil 29 has a spiral coil part 28a disposed on one side of an insulation sheet 38 which is the same as the insulation sheet 33. There is a case that the spiral coil part 28a is disposed on each side of the insulation sheet 38.

Both terminals 28b, 28c of the spiral coil part 28a are connected to an output processing circuit 54 shown in FIG. 5.

In FIG. 3, for easily understanding, each of the coils 20 (31, 32), 23, 26, 28 of the first to fourth sheet coils 21, 24, 27, 29 is schematically shown such that each of the coils is apart from the corresponding insulation sheets 30, 33, 35, 38. Actually, because each of the coils 20 (31, 32), 23, 26, 28 is print-wired on the corresponding insulation sheets 30, 33, 35, 38, each thickness of them is remarkably small.

Moreover, since each of the coils 20 (31, 32), 23, 26, 28 of the first to fourth sheet coils 21, 24, 27, 29 is arranged one by one per one plain face, the rotation angle detecting device 3 can be considerably made thin. There is a case that each of the coils 20 (31, 32), 23, 26, 28 is arranged two or more per one plain face.

In the above described configuration:
a magnetic field is formed between the core 19 mounted on the base 7 and the other core 19 mounted on the facing surface of the disk part 8a of the rotating plate 8 opposing to the base, wherein each of the cores 19 is disposed on each outside of a pair of the first sheet coil 21 provided with the excitation coils 20 and the second sheet coil 24 provided with the detecting coil 23;
another magnetic field is formed between the core 19 mounted on the facing surface of the disk part 8a of the rotating plate 8 opposing to the cover and the other core 19 mounted on the cover 9, wherein each of the cores 19 is disposed on each outside of another pair of the third sheet coil 27 provided with the primary coil 26 of the output transformer 25 and the fourth sheet coil 29 provided with the secondary coil 28 of the output transformer 25; and an interaction between the above both magnetic fields formed at each side of the disk part 8a of the rotating plate 8 is insulated by the disk part 8a.

Therefore, it is made possible to align the first to fourth sheet coils 21, 24, 27, 29 in the axial direction of the rotating shaft 5.

It is preferable that the first and second excitation coils 31, 32 of the first sheet coil 21 and the detecting coil 23 of the second sheet coil 24 are configured such that inner diameter parts of each of the coils are formed by coupling each corresponding gap between inner ends of pluralities of radially directed parts via each inner arcuate part, and outer diameter parts of each of the coils are formed by coupling each corresponding gap between outer ends of the radially directed parts via each outer arcuate part;
that an inner diameter of the core 19 disposed on the base 7 is larger than each inner diameter configured by the corresponding inner arcuate parts of the first excitation coil 31 and the second excitation coil 32 of the first sheet coil 21;
that an outer diameter of the core 19 disposed on the base 7 is smaller than each outer diameter configured by the corresponding outer arcuate parts of the first excitation coil 31 and the second excitation coil 32 of the first sheet coil 21;
that an inner diameter of the core 19 disposed on the facing surface of the disk part 8a of the rotating plate 8 opposing to the base is larger than an inner diameter configured by the inner arcuate parts of the detecting coil 23 of the second sheet coil 24; and
that an outer diameter of the core 19 disposed on the facing surface of the disk part 8a of the rotating plate 8 opposing to the base is smaller than an outer diameter configured by the outer arcuate parts of the detecting coil 23 of the second sheet coil 24.

According to such a configuration, each of the cores 19 forming a magnetic field faces to only the corresponding radially directed parts of the first excitation coil 31, the second excitation coil 32 and the detecting coil 23, and therefore it is possible to eliminate a magnetic influence by the arcuate parts coupling between the radially directed parts of each of the coils, and to improve an S/N ratio, that is a signal-to-noise ratio.

Accordingly, it is possible to reduce exciting currents and to make each of the coils smaller such that the whole device is made smaller.

Next, with referring to a block diagram shown in FIG. 5, a configuration and functions of the controller 50 are explained.

As shown in FIG. 5, the detecting coil 23 and the primary coil 26 of the output transformer 25 on the side of the rotating plate 8 in the rotation angle detecting device 3 are coupled in series and are made to be a closed-loop-like structure via the connection assembly 37.

The first and second excitation coils 31, 32 mounted on the base 7 which is a stator of the rotation angle detecting device 3 are respectively coupled to a first and a second excitation circuits 52, 53 of the detector control circuit 51. A modulation signal S1 is applied to the first excitation coil 31 from the first excitation circuit 52, wherein the modulation signal S1 is obtained by amplitude modulating a high frequency signal. A modulation signal S2 is applied to the second excitation coil 32 from the second excitation circuit 53, wherein the modulation signal S2 is obtained by amplitude modulating a high frequency signal so that the electrical angle of it is differentiated from that of the modulation signal S1, for example 90°.

Since an exciting current supplied to the lead wires 31b, 31c of the first excitation coil 31 and an exciting current supplied to the lead wires 32*b*, 32*c* of the first excitation coil 32 are alternating currents, the current directions are cyclically changed between a condition: the lead wire 31*b*→the lead wire 31*c*, lead wire 32*b*→the lead wire 32*c* and another condition: the lead wire 31*b*←the lead wire 31*c*, the lead wire 32*b*←the lead wire 32*c* respectively.

In this example: since the arrangement of the lead wires 31*b*, 31 *c*, 32*b*, 32*c* is provided as described above; when the lead wire 31*b* is set as a +sin phase lead wire for outputting a +sin-phase output signal, the lead wire 31*c* is determined as a −sin phase lead wire for outputting a −sin phase output signal, the lead wire 32*b* is determined as a +cos phase lead wire for outputting a +cos phase output signal, and the lead wire 32*c* is determined as a −cos phase lead wire for outputting a −cos phase output signal.

Moreover, as described above, the first and second excitation coils 31, 32 are polarity inversion excitation coils each of which the phase is inverted at an angular position of 180°. Therefore, even if a noise is generated in any of their output signals, they can exhibit a noise canceling effect so as to cancel the noise mutually.

Incidentally, the above Patent Literature 3 (JP 3,047,231 B) describes that a polarity inversion circuit is provided in a resolver control circuit. On the other hand, according to this embodiment of the present invention, the first and second excitation coils 31, 32 can invert their polarity by their coil patterns so as to exhibit the noise canceling effect without providing a polarity inversion circuit in the detector control circuit 51.

When the rotating plate 8 is rotated with the rotating shaft 5 of the electric motor 2 in the condition that the modulation signals S1, S2 are respectively applied to the first and second excitation coils 31, 32, a composite voltage induced by the modulation signals S1, S2 is generated in the detecting coil 23 as an output signal SO. This output signal SO is applied to the output processing circuit 54 via the output transformer 25 configured by the primary coil 26 and the secondary coil 28.

In the output processing circuit 54, the output signal SO is demodulated by a high-frequency-signal separating circuit (not shown) and a temperature is compensated by a compensation circuit (not shown) so that the output signal SO is output as an angle detection signal SA. The angle detection signal SA is applied to an angle control circuit 57 of a motor control circuit 56 via an A/D converter 55.

Regarding specific devices and methods for generating the modulation signals S1, S2 at the first and second input circuits 52, 53, and for demodulating and compensating the output signal SO at the output processing circuit 54; because they are well-known by the above Patent Literature 3 and so on and are not directly concerned with the present invention, the drawings and the detailed description of them are omitted.

By the angle control circuit 57 of the motor control circuit 56, an angle control signal SAc is calculated according to a condition set by the motor operating device 58 based on the angle detection signal SA applied from the output processing circuit 54 of the detector control circuit 51, and the angle control signal SAc is applied to the motor operating circuit 59.

The motor operating circuit 59 turns on and off the electric motor 2 based on the operation of motor operating device 58, and stops the operation of the electric motor 2 and changes a rotating speed of it according to the angle control signal SAc.

As described above, according to the first embodiment of the present invention: since a pair of the excitation coil 20 and the detecting coil 23, and another pair of the primary and secondary coils 26, 28 which constitute the output transformer 25 are aligned in the axial direction of the rotating shaft 5, the outer diameter of the whole device centered on the rotating shaft 5 is reduced; and since the all coils 20, 23, 26, 28 are sheet coils, the whole device can be made thin.

Thus, the device can be fixed to a member which rotates or turns supported by a shaft such as not only the small-sized electric motor 2, but also a part between a rotating shaft and a bearing, an articulated arm part of a robot, etc., and the device can precisely detect the rotation angle or the turning angle of such a member which rotates or turns supported by the shaft.

The connection assembly 37 is formed with the one or more conducting strips 11 which are disposed on the outer peripheral surface of the cylindrical shaft 8*c* of the rotating plate 8 and are oriented in the axial direction of the rotating shaft 5 so as to extend over both lateral sides of the rotating plate 8; the contactors 34, 34 which are connected to the corresponding terminals of the detecting coil 23 of the second sheet coil 24 and are contacted with the corresponding conducting strips 11; and the contactors 36, 36 which are connected to the corresponding terminals of the primary coil 26 of the third sheet coil 27 and are contacted with the corresponding conducting strips 11. Therefore, by fixing the second and third sheet coils 24, 27 to the rotating plate 8 from its both sides such that their contactors 34, 36 are respectively coordinated to the positions of the conducting strips 11 disposed on the outer peripheral surface of the cylindrical shaft 8*c*, the contactors 34, 36 are respectively contacted with the conducting strips 11, and thereby electrically connecting the detecting coil 23 with the primary coil 26 via the conducting strips 11 easily and securely.

Moreover, since the second and third sheet coils 24, 27 can be electrically connected at a part near to the rotating shaft 5, a dynamic unbalance is hard to occur compared to a case that they are connected to the outer peripheral part of the rotating plate 8.

The rotating plate 8 comprises a disk part 8*a* with a central hole 8*b* and a cylindrical shaft 8*c* passing through the central hole 8*b*; and the connection assembly 37 is formed with one or more conducting strips 11 which are disposed on the outer peripheral surface of the cylindrical shaft 8*c* and are oriented in the axial direction of the cylindrical shaft 8*c* so as to extend over both lateral sides of the disk part 8*a*; the contactors 34, 34 which are connected to the corresponding terminals of the detecting coil 23 of the second sheet coil 24 and are contacted with the corresponding conducting strips 11; and the contactors 36, 36 which are connected to the corresponding terminals of the primary coil 26 of the third sheet coil 27 and are contacted with the corresponding conducting strips 11. Therefore, without directly treating the rotating shaft 5 in order to fix the conducting strips 11, the second and third sheet coils 24, 27 can be connected in the rotating plate 8.

Since each of the contactors 34, 36 is made of an elastic tongue piece deformable in the axial direction of the rotating plate 8, each of the contactors 34, 36 is elastically deformed in the axial direction of the rotating plate 8 so as to be pressure welded to each of the conducting strips 11 naturally when the second and third sheet coils 24, 27 are respectively positioned to be fixed to each side of the rotating plate 8. Therefore, it is easy to fix the second and third sheet coils 24, 27 to the rotating plate 8, and the electrical connections of the contactors 34, 36 to each of the conducting strips 11 are not disconnected because the contactors 34, 36 are pressure welded to the corresponding conducting strips 11 by their elastic restoring force.

Since the ring-shaped core 19 is respectively disposed between the base 7 and the first sheet coil 21, between the facing surface of the rotating plate 8 to the base and the second sheet coil 24, between the facing surface of rotating plate 8 opposing to the cover and the third sheet coil 27, and between the cover 9 and the fourth sheet coil 29; each magnetic flux density generated by the currents passing through each of the coils 20, 23, 26, 28 is increased to intensify a detection output.

Since the excitation coil 20 comprises the first and second excitation coils 31, 32 which are respectively disposed on the front and rear surfaces of the insulation sheet 30 such that the electrical angle phases of them are different from each other, detection accuracy is increased while keeping the downsizing and the thinning of the whole device.

Since the first and second excitation coils 31, 32 are polarity inversion excitation coils each of which the phase is inverted at the angular position of 180°, a noise on the side of excitation can be canceled to increase the detection accuracy.

It is possible to provide a small-sized electric motor with a rotation angle detecting device 1 by fixing the rotation angle detecting device 3 which is capable of the downsizing and the thinning to the electric motor 2.

Figure 6:
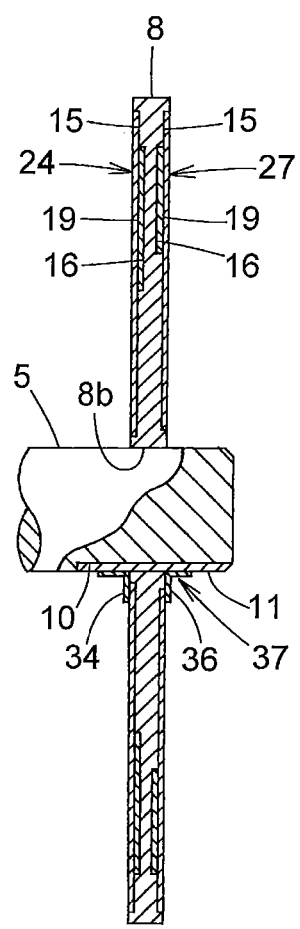
FIG. 6 is an enlarged cross-sectional plan view showing a connecting part corresponding to that shown in FIG. 4 in a second embodiment of the rotation angle detecting device.

FIG. 6 shows a second embodiment of the rotation angle detecting device of the present invention. The same or similar members as in the first embodiment are merely shown by the same reference signs respectively, and the drawings and the detailed explanation of them are omitted.

In this second embodiment, the one or more recessed grooves 10 oriented in the axial direction of the rotating shaft 5 are disposed on the outer peripheral surface of the tip portion of the rotating shaft 5 passing through the central hole 8b of the rotating plate 8 formed in a mere disk shape, the conducting strip 11 is fitted to each of the recessed grooves 10, 10 so as to extend over both lateral sides of the rotating plate 8, each of the contactors 34 connected to the corresponding terminals of the detecting coil 23 of the second sheet coil 24 disposed on the facing surface of the rotating plate 8 opposing to the base is pressure welded and fixed to the corresponding conducting strips 11 by soldering, and each of the contactors 36 connected to the corresponding terminals of the primary coil 26 of the third sheet coil 27 disposed on the facing surface of the rotating plate 8 opposing to the cover is pressure welded and fixed to the corresponding conducting strips 11 by soldering.

That is, in the second embodiment: the connection assembly 37 is formed with the one or more conducting strips 11 which are disposed on the outer peripheral surface of the rotating shaft 5 passing through the rotating plate 8 and are oriented in the axial direction of the rotating shaft 5 so as to extend over both lateral sides of the rotating plate 8; the contactors 34 which are connected to the corresponding terminals of the detecting coil 23 of the second sheet coil 24 and are contacted with the corresponding conducting strips 11; and the contactors 36 which are connected to the corresponding terminals of the primary coil 26 of the third sheet coil 27 and are contacted with the corresponding conducting strips 11.

Other components are the same as in the first embodiment.

According to this second embodiment, by fixing the second and third sheet coils 24, 27 to the rotating plate 8 from its both sides such that their contactors 34, 36 are respectively coordinated to the positions of the conducting strips 11 disposed on the outer peripheral surface of the rotating shaft 5, the contactors 34, 36 are respectively contacted with the conducting strips 11, and thereby electrically connecting the detecting coil 23 with the primary coil 26 via the conducting strips 11 easily and securely.

Moreover, since the second and third sheet coils 24, 27 can be electrically connected at a part near to the rotating shaft 5, a dynamic unbalance is hard to occur compared to a case that they are connected to the outer peripheral part of the rotating plate 8.

Moreover, although the rotating plate 8 in the first embodiment is constructed from two members which are the disk part 8a and the cylindrical shaft 8c, the rotating plate 8 in the second embodiment can be constructed from one member formed in a mere disk shape.

By fixing the contactors 34, 36 to the corresponding conducting strips 11, not only the electrical connections between the contactors 34, 36 and the corresponding conducting strips 11 are made strong, but also a position aberration and a relative rotation of the rotating plate 8 to the rotating shaft 5 can be prevented. Therefore, a fixing means of the rotating plate 8 to the rotating shaft 5 can be omitted.

The present invention is not restricted to the above embodiments, and various modifications may be added to the present invention unless deviating from the scope of Claims as follows.

(1) The positions of the base 7 and the cover 9 are replaced each other.

That is, the base 7 is replaced by the cover 9 and vice versa such that the rotation angle detecting device 3 is fixed to the electric motor 2 while the lateral orientation of the device shown in FIG. 1 is inverted.

(2) The connection assembly 37 is a mere conducting wire connecting the terminal of the detecting coil 23 of the second sheet coil 24 and the terminal of the primary coil 26 of the third sheet coil 27 by passing through the rotating plate 8.

According to such a constitution, the connection assembly 37 can be considerably simplified.

(3) The cylindrical shaft 8c of the rotating plate 8 in the first embodiment is fixed to the rotating shaft 5 by directly press-fitting.

INDUSTRIAL APPLICABILITY

The rotation angle detecting device of the present invention can be easily fixed to a member which rotates or turns supported by a shaft such as not only an electric motor, but also a part between a rotating shaft and a bearing, an articulated arm part of a robot, etc., and the device can precisely detect the rotation angle or the turning angle of such a member which rotates or turns supported by a shaft.

The electric motor with a rotation angle detecting device of the present invention can be downsized. Therefore, when this electric motor is applied to a drive of a small member which rotates or turns supported by a shaft in a robot, a vehicle, etc., it is possible to precisely control an angle of such a small member.

What is claimed is:

1. A rotation angle detecting device for detecting a rotation angle of a rotating shaft rotatably installed in a fixed body, comprising:
   a rotating plate fixed to the rotating shaft;
   a base mounted on the fixed body so as to face the rotating plate;

a cover fixed to the fixed body so as to spread over the rotating plate;

a first sheet coil which is mounted on a facing surface of the base opposite the rotating plate and is provided with an excitation coil;

a second sheet coil which is mounted on a facing surface of the rotating plate opposite the base and is provided with a detecting coil opposite the excitation coil;

a third sheet coil which is mounted on another facing surface of the rotating plate opposite the cover and is provided with a primary coil of an output transformer connected to the detecting coil by a connection assembly passing through the rotating plate; and a fourth sheet coil which is mounted on a facing surface of the cover opposite the rotating plate and is provided with a secondary coil opposite the primary coil of the output transformer.

2. The rotation angle detecting device according to claim 1, wherein the connection assembly comprises:

one or more conducting strips which are disposed on an outer peripheral surface of the rotating shaft passing through the rotating plate and are oriented in an axial direction of the rotating shaft so as to extend over both lateral sides of the rotating plate, a first contactor connected to a terminal of the detecting coil of the second sheet coil so as to contact with the conducting strip, and another contactor connected to a terminal of the primary coil of the third sheet coil so as to contact with the conducting strip.

3. The rotation angle detecting device according to claim 2, wherein each of the first and the another contactors is made of an elastic tongue piece deformable in an axial direction of the rotating plate.

4. The rotation angle detecting device according to claim 2, wherein each of the first and the another contactors is fixed to the conducting strip.

5. The rotation angle detecting device according to claim 1, wherein the rotating plate comprises a disk part with a central hole and a cylindrical shaft fitted into the central hole, and the connection assembly comprises:

one or more conducting strips which are disposed on an outer peripheral surface of the rotating shaft passing through the rotating plate and are oriented in an axial direction of the rotating shaft so as to extend over both lateral sides of the rotating plate, a first contactor connected to a terminal of the detecting coil of the second sheet coil so as to contact with the conducting strip, and another contactor connected to a terminal of the primary coil of the third sheet coil so as to contact with the conducting strip.

6. The rotation angle detecting device according to claim 1, wherein the connection assembly is a conducting wire connecting the terminal of the detecting coil of the second sheet coil and the terminal of the primary coil of the third sheet coil by passing through the rotating plate.

7. The rotation angle detecting device according to claim 1, wherein a respective ring-shaped core is interposed between the base and the first sheet coil, between the facing surface of the rotating plate opposite the base and the second sheet coil, between the facing surface of the rotating plate opposite the cover and the third sheet coil, and between the cover and the fourth sheet coil.

8. The rotation angle detecting device according to claim 7, wherein the excitation coil and the detecting coil are configured such that inner diameter parts of each of the coils are formed by coupling each corresponding gap between inner ends of pluralities of radially directed parts via each inner arcuate part, and outer diameter parts of each of the coils are formed by coupling each corresponding gap between outer ends of the radially directed parts via each outer arcuate part;

that an inner diameter of the core mounted on the base is larger than an inner diameter configured by the inner arcuate parts of the excitation coil;

that an outer diameter of the core mounted on the base is smaller than an outer diameter configured by the outer arcuate parts of the excitation coil;

that an inner diameter of the core mounted on the facing surface of the rotating plate opposing to the base is larger than an inner diameter configured by the inner arcuate parts of the detecting coil; and that an outer diameter of the core mounted on the facing surface of the rotating plate opposing to the base is smaller than an outer diameter configured by the outer arcuate parts of the detecting coil.

9. The rotation angle detecting device according to claim 1, wherein the excitation coil comprises first and second excitation coils which are respectively disposed on front and rear surfaces of an insulation sheet such that phases of each electrical angle of them are different from each other.

10. The rotation angle detecting device according to claim 9, wherein the first and second excitation coils are polarity inversion excitation coils each of which has a phase which is inverted at an angular position of 180°.

11. An electric motor with a rotation angle detecting device comprising an electric motor of which one end portion of a rotating shaft protrudes from one end of a motor housing, and the rotation angle detecting device according to claim 1, wherein the base is fixed to the motor housing, and the rotating plate is fixed to the rotating shaft of the electric motor.

* * * * *